(12) United States Patent
Hicks

(10) Patent No.: US 6,412,961 B1
(45) Date of Patent: Jul. 2, 2002

(54) RECTIFYING MIRROR

(76) Inventor: Robert Andrew Hicks, 2429 Locust St., Apt. 408, Philadelphia, PA (US) 19103

( * ) Notice: Subject to any disclaimer, the term of this patent is extended or adjusted under 35 U.S.C. 154(b) by 0 days.

(21) Appl. No.: 09/802,711

(22) Filed: Mar. 9, 2001

Related U.S. Application Data

(60) Provisional application No. 60/207,842, filed on May 30, 2000.

(51) Int. Cl.[7] .............................................. G02B 5/08
(52) U.S. Cl. .................. 359/846; 359/847; 359/848; 359/849
(58) Field of Search .................. 859/846, 847, 859/848, 849, 850, 853, 838; 362/61, 80, 297, 299, 304, 328, 343, 346, 347

(56) References Cited

U.S. PATENT DOCUMENTS

| | | | |
|---|---|---|---|
| 4,436,372 A | | 3/1984 | Schmidt et al. |
| 4,449,786 A | | 5/1984 | McCord |
| 4,811,029 A | * | 3/1989 | Nomoto et al. ............. 343/779 |
| 4,945,454 A | * | 7/1990 | Bunse et al. ................. 362/61 |
| 5,459,475 A | * | 10/1995 | Shen et al. ................ 343/81 P |
| 5,793,542 A | | 8/1998 | Kondo et al. |
| 5,816,693 A | * | 10/1998 | Winston et al. ............. 362/347 |
| 6,069,755 A | | 5/2000 | Li |

OTHER PUBLICATIONS

R. Andrew Hicks, et al., Reflective Surfaces as Computational Sensors, Department of Computer and Information Science, University of Pennsylvania, Grasp Laboratory, 5 pages, 1999.

R. Andrew Hicks, Optically Enhanced Visual Sensors, Department of Mathematics and Computer Science (Drexel University, pp. 1–15).

Kim C. NG., et al., Human Tracking and Dynamic View Synthesis using Network of Omni–Directional Vision Sensors Department of Electrical and Computer Engineering, University of California.

Stephen Bogner, et al. Progress Video Immersion using Panospheric Imaging, Proceedings of the SPIE 12 Annual International Symposium on Aerospace/Defense sensing, Simulation, and Controls; Cockpit Displays V: Displays for Defense Applications: SPIE vol. 3363; Orlando Florida (1998).

(List continued on next page.)

*Primary Examiner*—Mohammad Sikder
(74) *Attorney, Agent, or Firm*—Caesar, Rivise, Bernstein, Cohen & Pokotilow, Ltd.

(57) ABSTRACT

A mirror for use in a catadioptric system, is provided which is a substantially circular mirror having a rotationally symmetric cross section by a set of points substantially close to a curve satisfied by a differential equation as follows:

$$\frac{2F'(x)}{1-F'(x)^2} = \frac{d(x)-x}{F(x)}$$

where x is the radius of the mirror and F(x) is the cross-sectional shape. Alternatively, a mirror for use in a catadioptric system, is provided which is a substantially circular mirror having a rotationally symmetric cross section determined by a differential equation as follows:

$$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)}$$

where x=f(t)/(F(t)–f–h), f is the focal length, h is the height above an object plane, and F(t) is the cross-sectional shape.

1 Claim, 9 Drawing Sheets

OTHER PUBLICATIONS

Shih–Schon Lin et al., True Single View Point Cone Mirror Omni–Directional Catadioptric Camera System, An Optical Model, GRASP Laboratory, Computer and Information Science Department, University of Pennsylvania, 2001.

Yasushi Yagi, et al., Real–Time Omnidirectional Image Sensor (COPIS) for Vision–Guided Navigation., IEEE Transaction on Robotics and Automation vol. 10, No. 1, Feb. 1994.

Yoshio Onoe, et al., Telepresence by Real–Time View–Dependent Image Generation from Omnidirectional Video Streams, Computer Vision and Image Understanding, vol. 71. No. 2 Aug. pp. 154–165, 1998, Article No.IV980705.

Yasushi Yagi, et al., Map–Based Navigation for a Mobile Robot with Omnidirectional Image Sensor COPIS, IEEE Transactions on Robotics and Automation, vol. 11, No. 5, Oct. 1995.

Hiroshi Ishiguro, et al., Omni–Directional Stereo, IEEE Transactions on Pattern Analysis and Machine Intelligence, vol. 14, No. 2, Feb. 1992, pp. 257–266.

R. A. Hicks, et al., Closed Form Solutions for Reconstruction Via Complex Analysis, Journal of Mathematics Imaging and Vision 13, 57–70, 2000.

R. Andrew Hicks, et al., Catadioptric Sensors that Approximate Wide–angle Perspective Projections, Proc.Comp. Vision & Pattern Recognition, 2000.

Simon Baker, et al., A Theory of Single–Viewpoint Catadioptric Image Formation, International Journal of Computer Vision.

Claude Pegard, et al., A Mobile Robot using a Panoramic View, Laboratory of Automatic Systems, Picardie University, Amiens, France, International Conference on Robotics and Automation–Apr. 1996 pp. 89 to 96.

Steven Derrien, et al. Approximating a Single Viewpoint in Panoramic Imaging Devices, IEEE Workshop on Omnidirectional Vision.

Tanya L. Conroy, et al., Resolution Invariant Surfaces for Panoramic Vision Systems, Department of Systems Engineering, RSISE, Australian National University, Canberra, ACT 0200.

J. S. Chahl, et al., A Complete Panoramic Vision System, Incorporating Imaging, Ranging, and Three Dimensional Navigation, IEEE Workshop on OmniVision.

J. S. Chahl, et al., Reflective surfaces for panoramic imaging, Applied Optics, Nov. 1, 1997–vol. 36, No. 31. pp. 8275–85.

J. S. Chahl, et al., Range estimation with a panoramic visual sensor, J. Opt. Soc. Am. A/vol. 14, No. 9 Sep. 1997, pp. 2144–51.

Hynek Bakstein, et al. Non–central cameras: A review, Oct. 3, 2000, Czech Technical University.

Mark Ollis, et al., Analysis and Design of Panoramic Stereo Vision Using Equi–Angular Pixel Cameras, Carnegie Mellon University, Pittsburgh, PA Jan. 1999.

Joshua Gluckman et al., Ego–Motion and Omnidirectional Cameras, Department of Computer Science, Columbia University , New York, NY.

Shree K. Nayar, et al., Folded Catadioptric Cameras, IEEE Proc. Of Computer Version & Pattern Recognition.

Shree K. Nayar, Omnidirectional Vision, Department of Computer Science, Columbia University, The Eighth International Symposium of Robotics Research, Hayama, Japan, Oct. 3–7, 1997.

Simon Baker, et al., A Theory of Catadioptric Image Formation, Proceedings of the $6^{th}$ International Conference on Computer Vision, Bombay, Jan. 1998.

Niall Winters, et al., Mobil Robot Navigation using Omni––directional Vision, Computer Vision and Robotics Group, Department of Computer Science, University of Dublin, Trinity College, Dublin 2–Ireland.

Tomas Svoboda., et al., Epipolar Geometry for panoramic Cameras, Center for Machine perception, Czech Technical University, Faculty of Electrical Engineering, Czech Republic.

Tomas Svoboda, et al., Central panoramic Cameras: Design and Geometry, Czech Technical University, Center for Machine perception, Prague, Czech Republic.

Tomas Svoboda, et al. Panoramic cameras for 3 D computation, Czech Technical University, Center for Machine Perception, Czech Republic, Feb. 2000.

Christopher Geyer et al., A Unifying Theory for Central Panoramic Systems and Practical Implications, GRASP Laboratory, University of Pennsylvania, Long Presentation at ECCV 2000, Dublin, Ireland.

Christopher Geyer et al., A Unifying Theory for Central Panoramic Systems and Practical Implications, GRASP Laboratory, University of Pennsylvania.

* cited by examiner

| DATA POINTS | |
|---|---|
| 0 | 0 |
| .0925 | .003329 |
| .185 | .013213 |
| .2775 | .029365 |
| .37 | .051359 |
| .4625 | .078698 |
| .555 | .110859 |
| .6475 | .147338 |
| .74 | .187665 |
| .8325 | .231419 |
| .925 | .278225 |
| 1.0175 | .327758 |
| 1.11 | .379731 |
| 1.2025 | .433897 |
| 1.295 | .490039 |
| 1.3875 | .547970 |
| 1.48 | .607525 |
| 1.5725 | .668559 |
| 1.665 | .730945 |
| 1.7575 | .794572 |
| 1.85 | .859340 |

DATA POINTS

```
0   0
.006250, .000002
.050000, .00009
.168750, .001041
.400000, .005752
.781250, .021770
1.350000, .064534
2.143750, .160869
3.200000, .351248
4.556250, .688478
8.250000, 1.231302
8.318750, 2.034764
10.800000, 3.142054
13.731250, 4.581075
17.150000, 6.365251
21.093750, 8.496365
25.600000, 10.967718
30.706250, 13.766860
36.450000, 16.877721
42.868750, 20.282204
```

RECTIFYING MIRROR

This application claims the benefit of U.S. Provisional Application Serial No. 60/207,842, filed May 30, 2000.

BACKGROUND OF THE INVENTION

This invention relates generally to the field of reflective surfaces that are capable of providing a wide field of view, and, in particular, to catadioptric sensors that are capable of providing a wide field of view.

The ability of a curved mirror to increase one's field of view is familiar from their use in stores for security purposes and as rear-view mirrors on automobiles. In both cases, the goal is to allow an observer to see more of a scene than would otherwise be visible.

The "distortion" typically seen in curved mirrors depends upon the shape of the mirror. Here, the word distortion implies that there is something unnatural or wrong with the projections obtained from these mirrors. A more accurate way to say that a mirror distorts the scene is simply to say that the projection is not a perspective projection. A perspective projection is formed by tracing a line from the image plane through a point (called the focal point or center of projection) until it touches an object in the scene. This is how a pinhole camera forms images.

Historically, it was only possible to construct mirrors in spherical or parabolic shapes. These shapes were appropriate for the traditional applications, such as astronomy. In recent years though, it has become possible through computer numerically controlled machining to create parts of almost any given mathematical shape. Consequently, it is now possible to make mirrors with an exactly prescribed geometry.

These developments are applicable to some parts of computer vision and related applications (e.g. robot control). Computer vision research has been dominated for decades by the traditional lens-CCD (charge-coupled device) sensor paradigm, and this paradigm can now be extended due to recent technological advances.

Recently, many researchers in the robotics and vision community have considered visual sensors that are able to obtain wide fields of view. Such devices are the natural solution to various difficulties encountered with conventional imaging systems.

The two most common means of obtaining wide fields of view are fish-eye lenses and reflective surfaces, also known as catoptrics. When catoptrics are combined with conventional lens systems, known as dioptrics, the resulting sensors are known as catadioptrics. The possible uses of these systems include applications such as robot control and surveillance. The present application is directed to catadioptric based sensors.

In the past few years, there has been a tremendous increase in research on the design and applications of catadioptric based sensors. Much of this work has been focused on designing sensors with a panoramic or wide field of view.

In S. Nayar, "Catadioptric Omnidirectional Camera", *Proc. Computer Vision Pattern Recognition*, pages 482–88 (1997), Nayar describes a true omni-directional sensor. In this case, the goal was to reconstruct perspective views. This sensor uses a parabolic mirror, which is essentially the only shape from which one can do a perspective unwarping of the image when using a camera that is well modeled by an orthographic projection (see S. Baker and S. Nayar, "A Theory of Catadioptric Image Formation", *Proc. International Conference on Computer Vision*, pages 35–42 (1998).

A different use of catadioptric sensors is an application of C. Pegard and E. Mouaddib, "A Mobile Robot Using a Panoramic view", *Proc. IEEE Conference on Robotics and Automation*, pages 89–94 (1996). In this case, a conical mirror is used to estimate a robot's pose. This is done using vertical lines in the world as landmarks, which appear as radial lines in the image. If the positions of these landmarks are known, then they can be used to estimate the robot's pose. In contrast to "Catadioptric Omnidirectional Camera" cited above, in this work, the authors use their device as a 2D sensor.

Navigation and map building with a mobile robot using a conical mirror is considered in Y. Yagi, S. Nishizawa, and S. Tsuji, "Map-Based Navigation for a Mobile Robot with Omnidirectional Image Sensor", *Trans. on Robotics and Automation I*, pgs. 1:634–1:648 (1995) and Y Yagi, S. Kawato, and S. Tsuji, "Real-Time Omnidirectional Image Sensor (Copis) for Vision-Guided Navigation" *Trans. on Robotics and Automation*, 10:11–10:22 (1994).

In J. Chahl and M. Srinivasan, "Range Estimation with a Panoramic Sensor", *J. Optical Soc. Amer. A*, pgs. 14:2144–14:2152 (1997), the authors describe a means of estimating range by moving a panoramic sensor, based on the fact that the local distortion of the image is range dependent. This method, which gives a range estimate in every azimuthal direction, is implemented using a conical mirror.

The work most related to the present invention is described in T. Conroy and J. Moore, "Resolution Invariant Surfaces for Panoramic Vision Systems", *Proc. International Conference on Computer Vision*, pgs. 392–97 (1999) and in J. Chahl and M. Srinivasan, "Reflective surfaces for panoramic imaging", *Applied Optics*, 36:8275–8285, 1997. In T. Conroy and J. Moore, "Resolution invariant surfaces for panoramic vision systems", *Proc. International Conference on Computer Vision*, pgs. 392–97 (1999), the authors derive a family of mirrors for which the resolution in the image is invariant to changes in elevation. In J. Chahl and M. Srinivasan. "Reflective Surfaces for Panoramic Imaging", *Applied Optics*, pgs. 36:8275–36:8285 (1997), the authors exhibit a family of reflective surfaces that preserve a linear relationship between the angle of incidence of light onto a surface and the angle of reflection onto the imaging device.

OBJECTS OF THE INVENTION

Accordingly, it is a general object of the present invention to provide a sensor that is capable of providing a wide field of view with minimal distortion.

It is a further object of the present invention to provide a catadioptric sensor that is capable of providing a wide field of view with minimal distortion.

It is a further object of the present invention to provide a catadioptric sensor that is capable of providing a wide field of view with minimal distortion for use in the robotics and vision community.

It is still a further object of the present invention to provide a catadioptric sensor that is capable of providing a wide field of view with minimal distortion that does not require a mechanical pan-tilt system.

It is yet another object of the present invention to provide a catadioptric sensor that is capable of providing a wide field of view with minimal distortion that does not require computerized unwarping.

Other objects and many attendant features of this invention will become readily appreciated as the same becomes better understood by reference to the following detailed description when considered in connection with the accompanying drawings.

SUMMARY OF THE INVENTION

The present invention is directed to two families of reflective surfaces that are capable of providing a wide field of view, and yet still approximate a perspective projection to a high degree. These surfaces are derived by considering a plane perpendicular to the axis of a surface of revolution and finding the equations governing the distortion of the image of the plane in this surface. This relation is then viewed as a differential equation and the distortion term is prescribed to be linear. By choosing appropriate initial conditions for the differential equation and solving it numerically, the surface shape is derived and a precise estimate as to what degree the resulting sensor can approximate a perspective projection is obtained. Thus, these surfaces act as computational sensors, allowing for a wide-angle perspective view of a scene without processing the image in software. The applications of such a sensor are numerous, including surveillance, robotics and traditional photography.

These and other objects of this invention are achieved by providing a mirror for use in a catadioptric system which is a substantially circular mirror having a rotationally symmetric cross section by a set of points substantially close to a curve satisfied by a differential equation as follows:

$$\frac{2F'(x)}{1-F'(x)^2} = \frac{d(x)-x}{F(x)}$$

where x is the radius of the mirror and F(x) is the cross-sectional shape, and d is linear. Alternatively, a mirror for use in a catadioptric system is provided which is a substantially circular mirror having a rotationally symmetric cross section determined by a differential equation as follows:

$$\frac{\frac{x}{f} + \frac{2F'(t)}{1-F'(t)^2}}{1 - \frac{x}{f}\frac{2F'(t)}{1-F'(t)^2}} = \frac{d(x)-t}{F(t)}$$

where x=ft/(F(t)−f−h), f is the focal length, h is the height above an object plane, and F(t) is the cross-sectional shape.

DETAILED DESCRIPTION OF THE PREFERRED EMBODIMENT

Figure 1:
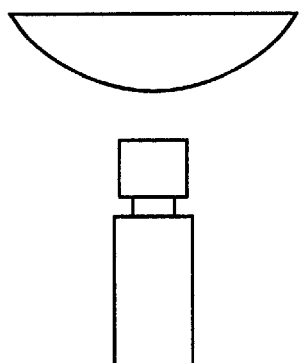
FIG. 1 is a simplified plan view of a catadioptric sensor, generically setup, similar to that used in accordance with the preferred embodiment of the present invention.

The present invention is directed to catadioptric based sensors. Often such systems consist of a camera pointing at a convex mirror as can be seen in FIG. 1.

How to interpret and make use of the visual information obtained by such systems, e.g., how they should be used to control robots, is not at all obvious. There are infinitely many different shapes that a mirror can have, and at least two different camera models, perspective and orthographic projection, with which to combine each mirror. The properties of the resulting sensors are very sensitive to these choices. The classic need for wide angle lenses has, of course been in the field of photography. In particular, underwater and architectural photography are two examples in which having a wide-angle lens is often crucial. The commercially available lens with the widest field of view (without radial distortion) that the authors are aware of is the Nikon 13 mm f15.6 Nikkor AIS, which provides a field of view of 118 degrees. A prototype orthographic sensor of the present invention provides, for example, a field of view of 142 degrees.

Figure 2A:
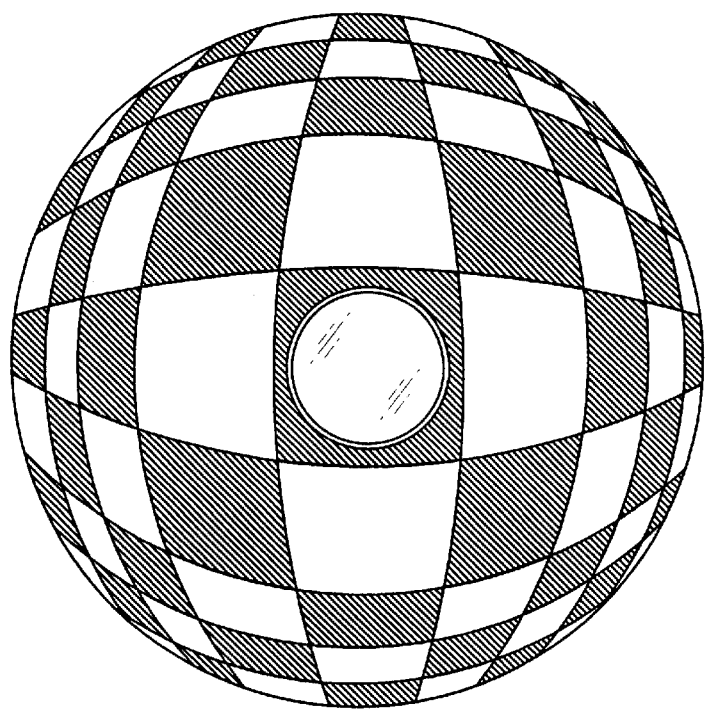
FIG. 2A is a checkerboard pattern from the viewpoint of a catadioptric sensor consisting of a spherical mirror and a standard camera that gives an approximate perspective projection where the mirror is approximately thirty centimeters above a square checkerboard pattern.
Figure 2B:
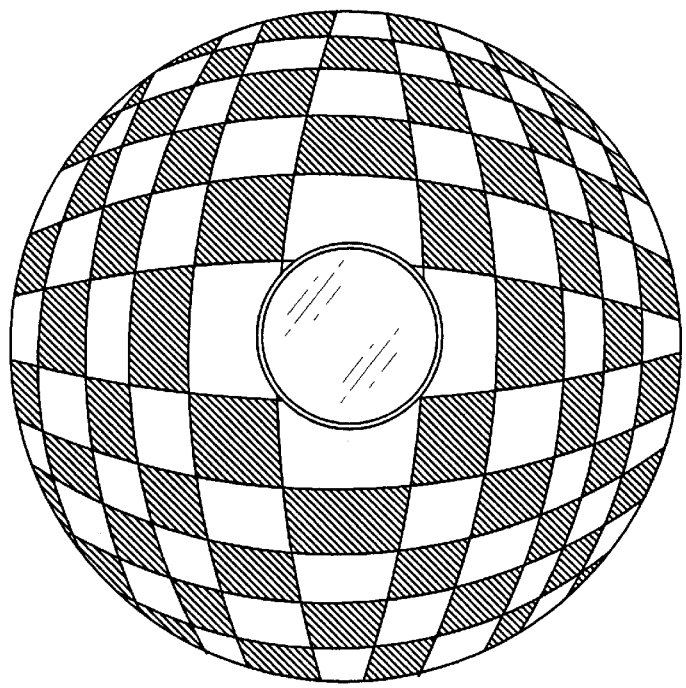
FIG. 2B is a checkerboard pattern from the viewpoint of a sensor that uses a parabolic mirror coupled with a camera that gives an approximate orthographic projection where the mirror is approximately thirty centimeters above a square checkerboard pattern.
Figure 9:
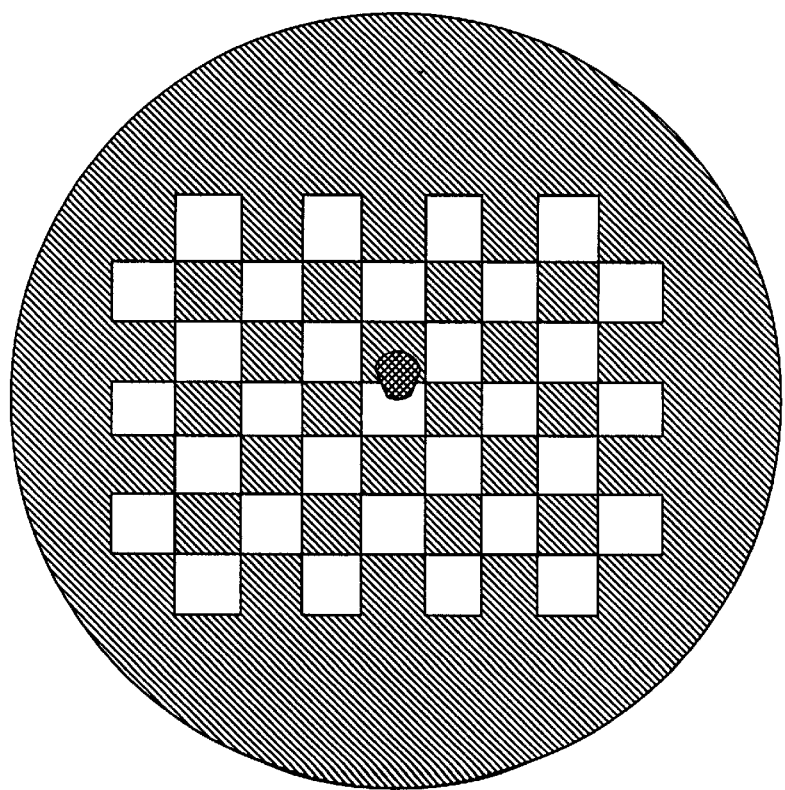
FIG. 9 is a checkerboard pattern from the viewpoint of a sensor in accordance with the present invention coupled with a camera that gives an approximate perspective projection where the mirror is approximately thirty centimeters above the checkerboard pattern, where the shape of the mirror is determined numerically solving a non-linear differential equation.
Figures 3, 4, 5:
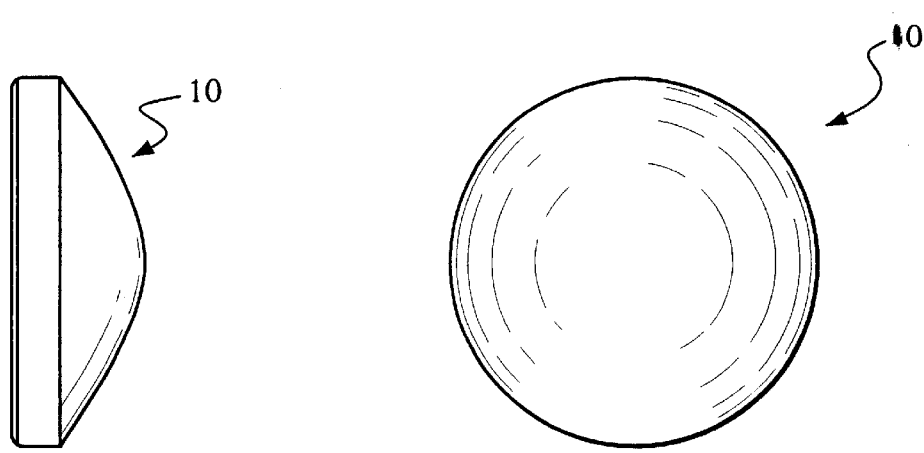
FIG. 3 is a side view of an orthographic mirror made in accordance with the present invention.
FIG. 4 is a front view of the orthographic mirror of FIG. 3.
FIG. 5 is a table of the data points used to construct a typical orthographic mirror of the present invention.
Figures 6, 7, 8:
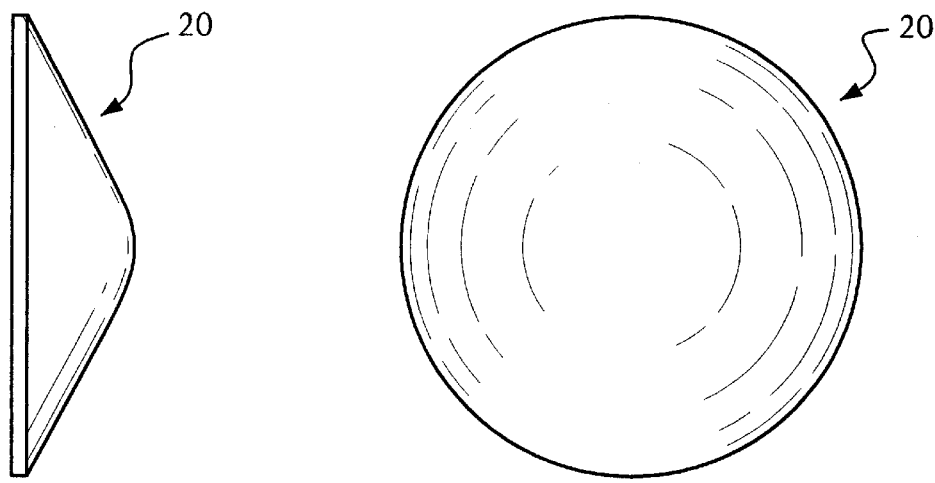
FIG. 6 is a side view of a perspective mirror made in accordance with the present invention.
FIG. 7 is a front view of the perspective mirror of FIG. 6.
FIG. 8 is a table of the data points used to construct a typical perspective mirror of the present invention.

Images of a planar, square, checkerboard pattern taken from sensors using spherical and parabolic mirrors appear in FIGS. 2A and 2B respectively. It is clear that the distortion caused by the spherical mirror is greater than that caused by the parabolic mirror. The present invention is directed to a class of sensors that provide a wide field of view with a perspective-like projection without any processing in software. In particular, it is possible to create a mirror that does not distort the checkerboard substantially, other than by a chosen scaling factor. FIGS. 3 and 4 depict an orthographic mirror 10 made in accordance with the present invention. FIG. 5 depicts a list of data points determined based from the differential equation for a rotationally symmetric cross section of an orthographic mirror of the present invention as will be described below. FIGS. 6 and 7 depict a perspective mirror 20 made in accordance with the present invention. FIG. 8 depicts a list of data points determined based from the differential equation of the present invention for a rotationally symmetric cross section of a perspective mirror as will be described below. An image taken from such a sensor in accordance with the present invention appears in FIG. 9. The key to finding the shape of this mirror is to determine the relationship between the equation of the mirror and how it distorts the checkerboard. This equation contains the derivative of the function describing a cross section of the mirror, and may be considered as a means for finding the distortion if the mirror shape is given. On the other hand, it can be considered as a differential equation in the shape of the mirror if the distortion function is given. By prescribing the distortion to be linear and solving the differential equation numerically, data points describing the cross section may be generated, which may then used to make prototypes out of steel or aluminum on a CNC lathe or mill.

An equation can now be derived that leads to the construction of one of the two different types of mirrors. One model is based on the perspective projection (a pinhole mirror) and the other based on an orthographic projection (an orthographic mirror). The pinhole mirror is more natural in the sense that the pinhole camera is a good model for the imaging devices used in many applications. On the other hand, an orthographic projection is not difficult to achieve using the appropriate optics, and the mathematics associated with it is often simpler than for the pinhole model.

The Orthographic Model

First, the orthographic model will be described.

Figure 10:
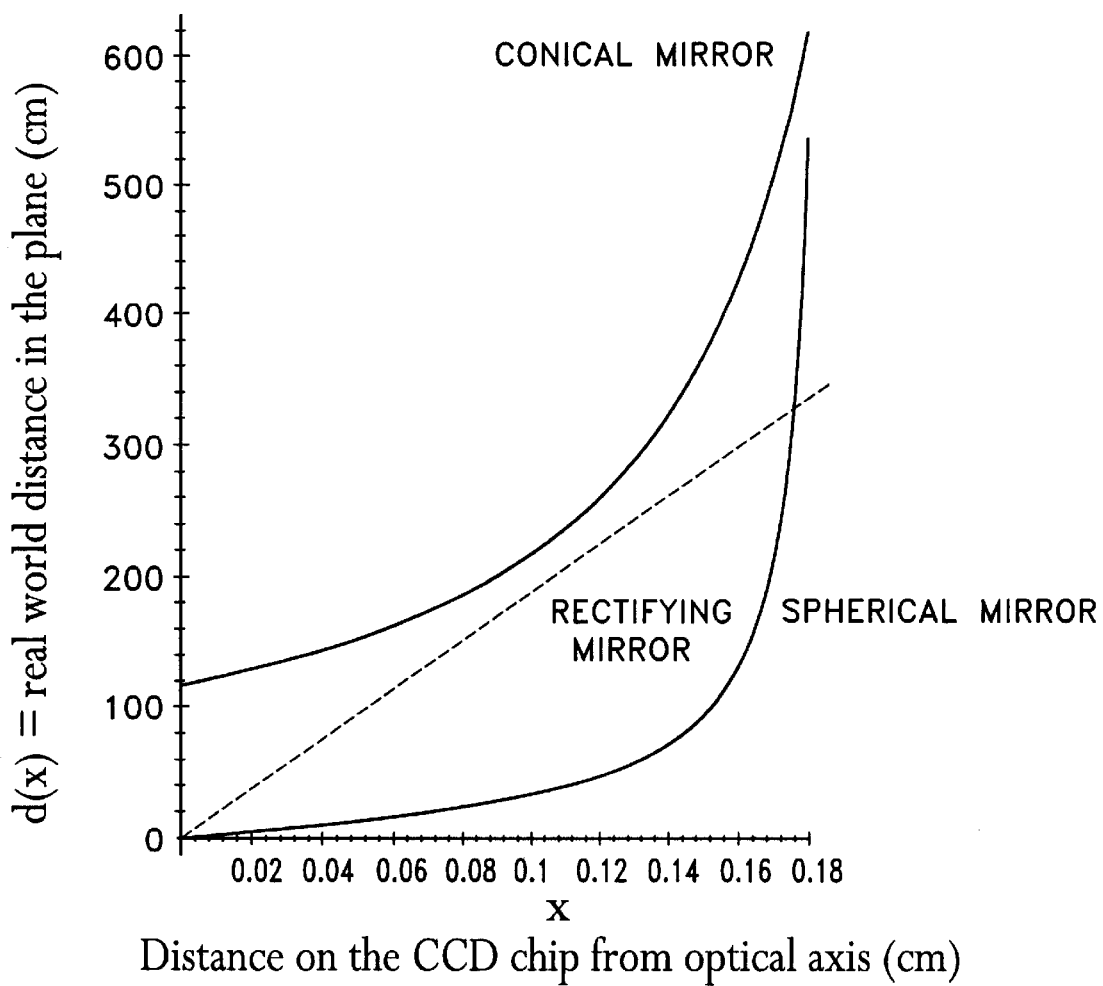
FIG. 10 is a graphical diagram of the distance functions for a conical mirror, a spherical mirror, and a rectifying mirror (defined herein as any mirror whose distance function is linear).

As can be seen in FIGS. 2A and 2B, if an object is on the floor, then the planar distance from the optical axis of the camera to any visible point of the object that touches the floor is a monotonic fraction of the pixel distance in the image. Therefore, distance fraction d, which takes pixel distances in the image and returns real world distances in the plane is known. It can also be seen in FIGS. 2A and 2B that the distance function is rapidly increasing and approaches infinity as the horizon line is approached. The present invention is directed to altering the mirror shape so that the distance function would be linear (or some other desired function), as is indicated in FIG. 10. For the purposes of the present invention, any such mirror with a linear distance function is defined as a rectifying mirror.

Figure 11:
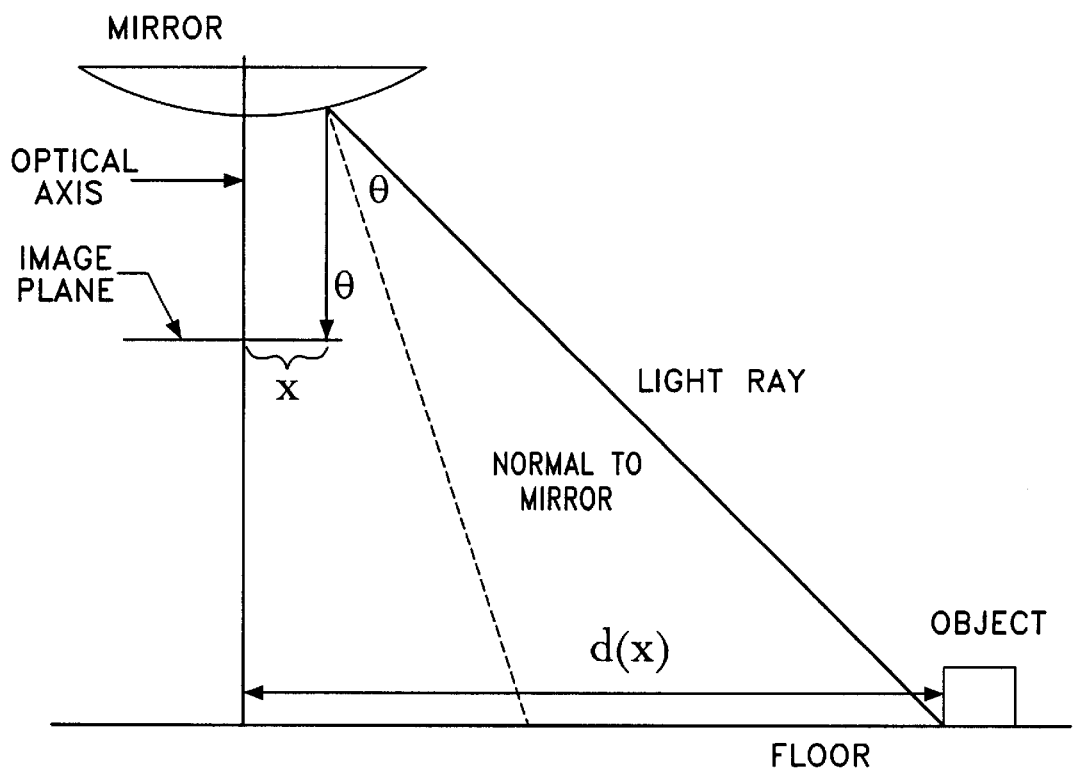
FIG. 11 is a schematic diagram for the derivation of the shape of a catadioptric sensor that uses a camera modeled with an orthographic projection.

First, the equation for d for an arbitrary mirror is defined. Consider an orthographic camera pointing up at a curved mirror, as is schematically depicted in FIG. 11. Here, a cross section of the system is seen, which is all that is necessary to consider since the mirror is rotationally symmetric. The goal of the present invention was to find an expression for $d(x)$ given the equation of the cross section of the mirror, F, and a point whose distance from the optical axis is x in the image plane.

From the diagram we have that $\tan(\theta) = F'(x)$, so that $$\tan(2\theta) = \frac{2F'(x)}{1 - F'(x)^2}.$$

On the other hand, the diagram implies that $$\tan(2\theta) = \frac{d(x) - x}{F(x)}.$$

Thus, we have the equation:

$$\frac{2F'(x)}{1 - F'(x)^2} = \frac{d(x) - x}{F(x)} \qquad (1)$$

There are two ways to view equation (1). The first is what we just described above, i.e. if one knows F, it may be substituted into the above equation to determine $d(x)$, which is how the curves in FIG. 10 were computed. On the other hand, one could choose $d(x)$ and then consider equation (1) to be a differential equation satisfied by F. If we solve this differential equation, then the resulting mirror will have d as its distance function. It is important to note though, that at this point we know only that this property holds only in the one chosen plane, and need not hold at other parallel planes. The reason for this is that the collection of rays that pass through two planes and reflect off of the mirror onto the image plane cannot be extended through the mirror to meet at a single point, i.e., the correspondence between the planes is not a perspective mapping. This point is discussed in more detail below.

Figure 12:
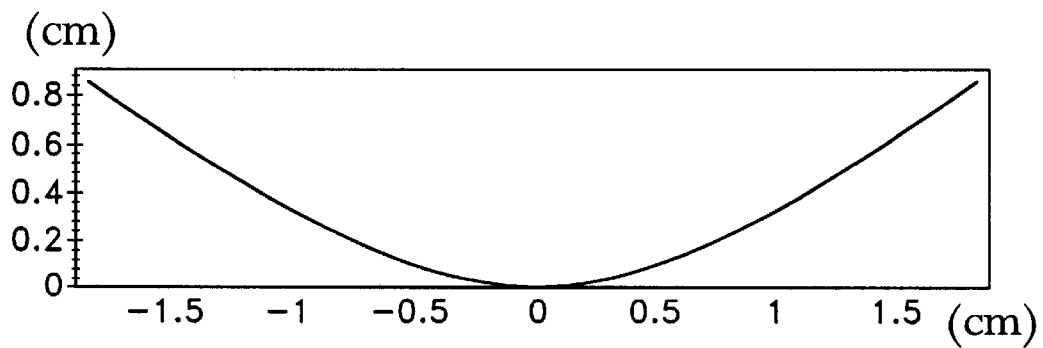
FIG. 12 is a graphical diagram of the cross section of the orthographic mirror constructed in accordance with the present invention.

A natural choice for the distance function is $d(x)=ax$ in equation (1). Considered as a differential equation, equation (1) is non-linear and numerical methods are called for. For example, an orthographic mirror could have a radius of 1.85 centimeters, $d(x)=54x$ and the initial value $F(0)=34$. Hence, the field of view was $\arctan((54 \cdot 1.85)/34)) \sim 142$ degrees. The resulting cross section can be seen in FIG. 12.

The above model was derived by considering how the sensor transformed a single plane, which we will always refer to as the floor. While for both the pinhole mirror and the orthographic mirror it is clear from experiments and simulations that planes perpendicular to the optical axis will be scaled by a constant, it is possible to show mathematically that with the properly chosen parameters, these mirrors will actually approximate a perspective projection to a high degree. In this section, the approximation for the orthographic mirror is derived.

Figure 13:
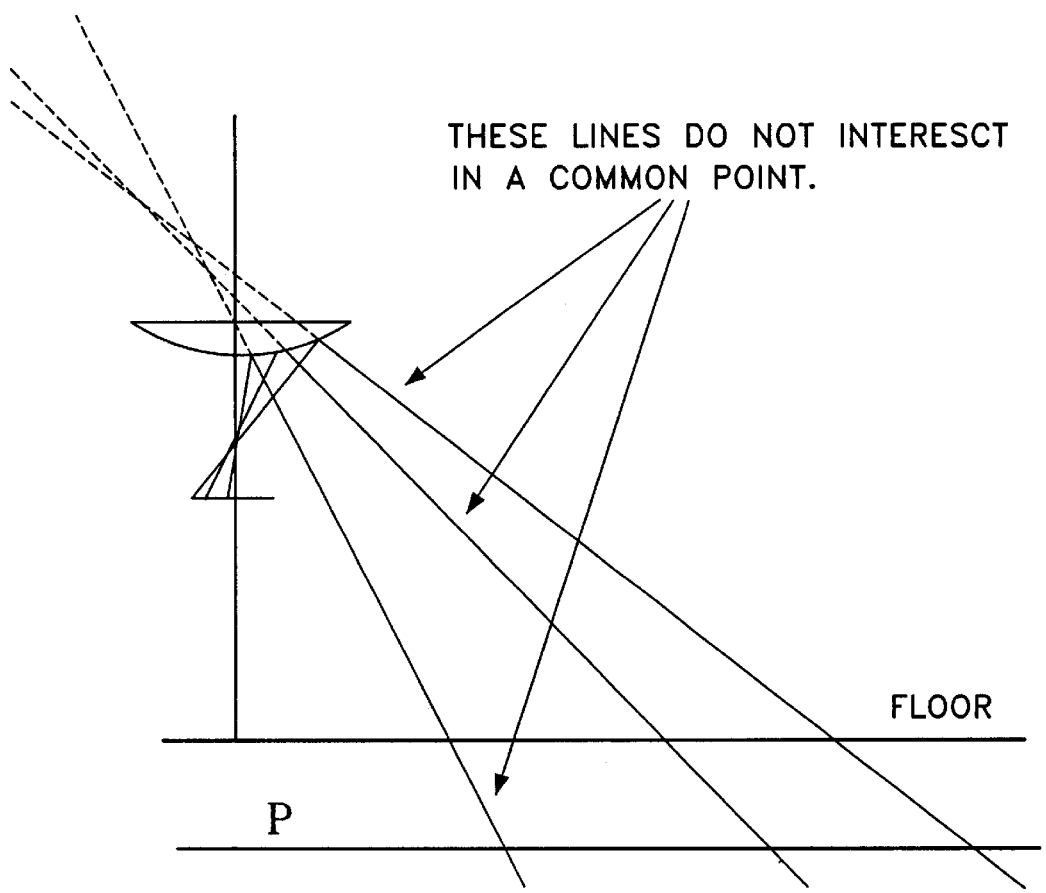
FIG. 13 is a schematic diagram of a catadioptric sensor where light rays entering the sensor by reflecting off the mirror have the property that, when extended beyond the mirror, do not intersect in a common point.

At first it may appear that rectifying mirrors should only scale planes and not distort them, but in fact they do both distort them a little. In order to see how an arbitrary plane, P, is imaged, how P is mapped to the floor must be known. If it is to be proportionally imaged, i.e. only transformed by a scale factor, then it must be transformed onto the floor by a scaling factor. For this to occur, the light rays that are entering the sensor by reflecting off of the mirror must have the property that, when extended beyond the mirror, they all intersect in a common point, see FIG. 13, i.e., there needs to be a single "effective viewpoint" for the sensor. Such a point does not exist for our two types of sensors, because, as is shown in S. Nayar, "Catadioptric omnidirectional camera", *Proc. Computer Vision Pattern Recognition,* pgs. 482–88 (1997), the only two catadioptric sensors with this property are the parabola coupled with an orthographic projection and the hyperbola coupled with a pinhole projection. Finally, we know that our surfaces are not paraboloids and hyperboloids, because as can be checked, parabolas and hyperbolas are not solutions to the appropriate differential equations.

Figure 14:
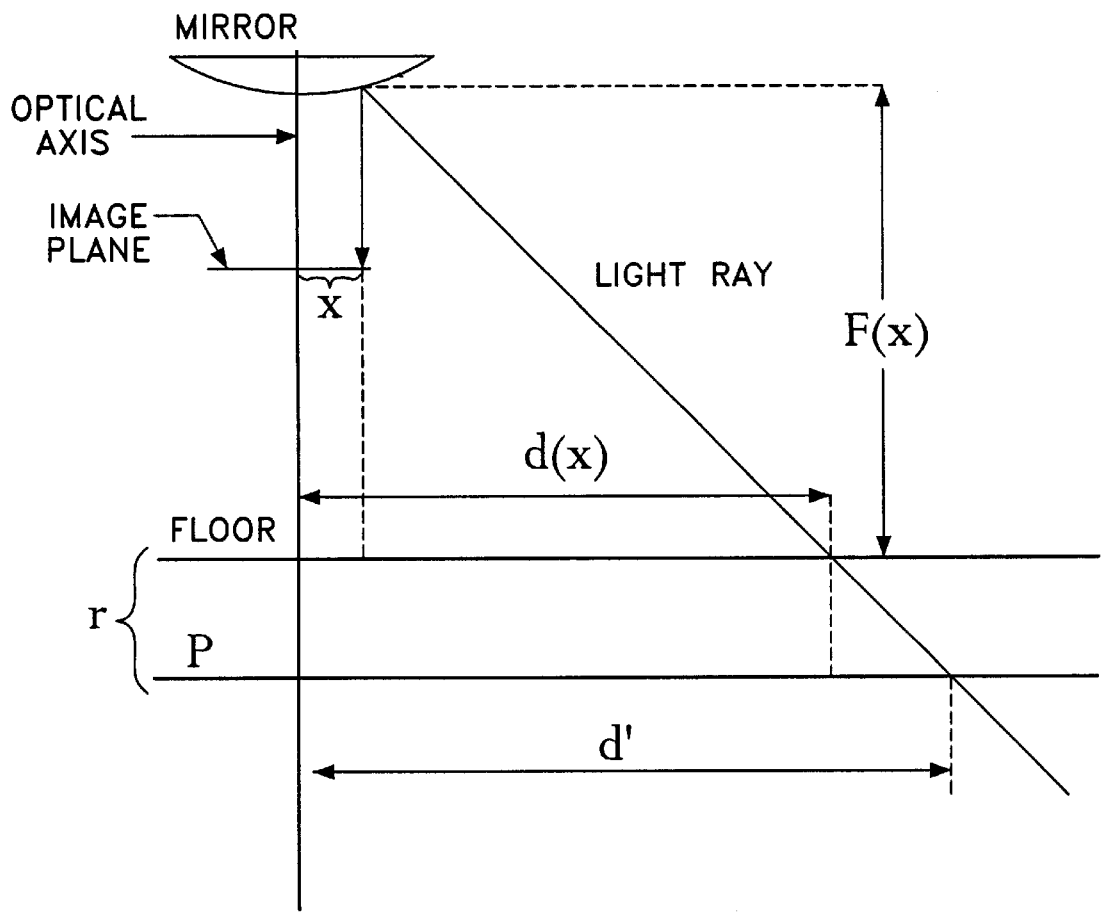
FIG. 14 is a schematic diagram catadioptric sensor depicting a single ray of light passing through a plane P and then the floor and surfaces parallel to the floor.

The reason why the orthographic mirror gives a perspective-like projection can be demonstrated by computing exactly how points in P are scaled onto the floor. In FIG. 14, a point in P with distance d from the optical axis is mapped to a point of distance d(x), which in turn is mapped to a point in the image plane of distance x from the optical axis. The distance between the two planes is r and the height of the mirror is F(0). Then clearly $$\frac{F(x)}{d(x)-x} = \frac{r}{d'-d(x)} \quad (2)$$

from which it follows that $$d'(x) = \frac{rd(x) - rx + F(x)d(x)}{F(x)} \quad (3)$$

Recall that d(x)=αx, where generally alpha is large (e.g., α is 54 for our prototype). Hence:

$$d'(x) = \frac{(r - r/\alpha) + F(x)d(x))}{F(x)} \quad (4)$$

Since we generally consider alpha to be large, we have the approximation $$d' = \frac{r + F(x)}{F(x)}d(x) \quad (5)$$

For our prototype orthographic mirror, F(0) was chosen to be 34 cm, and x varied from 0 to 1.85 cm. The maximum value of F occurs at x=1.85 cm with F(1.85)=34.85 cm. Thus, for that mirror, F(0)~F(x), which gives our final approximation:

$$d' \sim \frac{r + F(0)}{F(0)}d(x) \quad (6)$$

This last equation implies that this particular orthographic mirror will approximate a perspective projection with a pinhole placed at (0, F(0)).

The Perspective Model

Next, the perspective model will be described.

Figure 15:
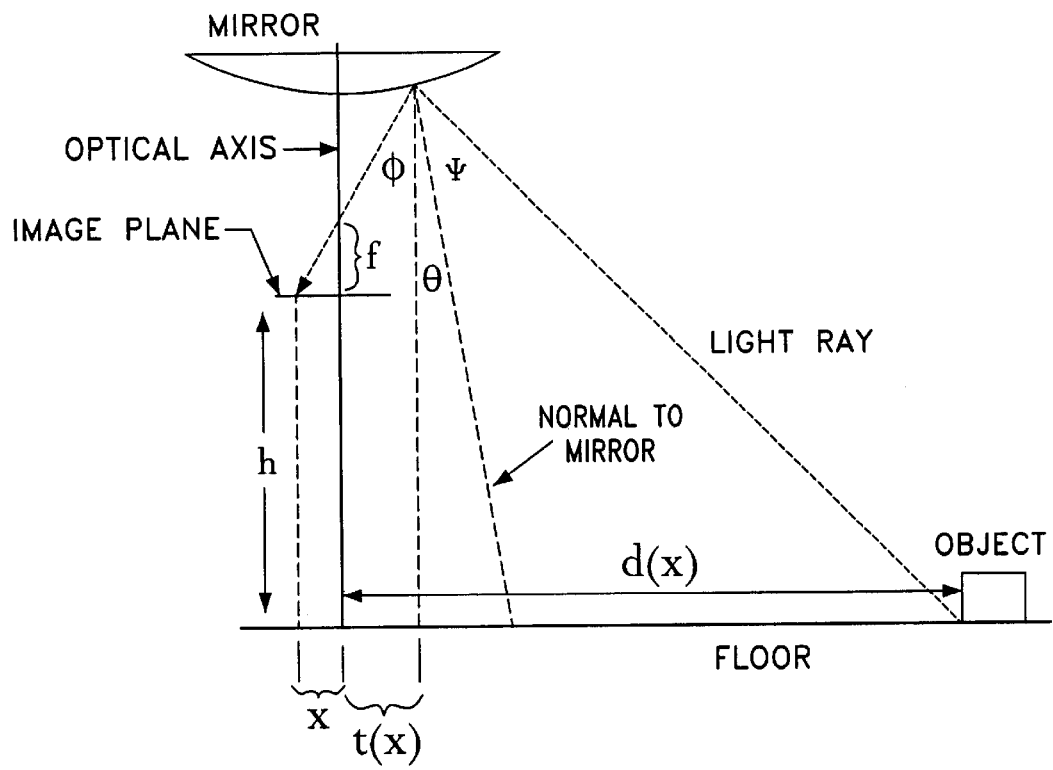
FIG. 15 is a schematic diagram for the derivation of the shape of a catadioptric sensor that uses a camera modeled with a perspective projection.

Consider a pinhole camera pointing up at a curved mirror, as is schematically depicted in FIG. 15. Here, a cross section of the system is shown. Again, the mirror is rotationally symmetric. The goal of the present invention is to find an expression for d(x) given the equation of the cross section fo the mirror, F, and a point whose distance from the optical axis is x in the image plane. The angle of reflection is equal to the angle of incidence. With respect to FIG. 15, φ+θ=ψ. Consequently, φ+2θ=ψ+θ so that:

$$\tan(\phi + 2\theta) = \tan(\psi + \theta) = \frac{d(x) - t(x)}{F(t(x))}. \quad (7)$$

Note that t(x) will be abbreviated as t hereinafter.

It is therefore easy to see from FIG. 15 that tan(φ)=x/f so that:

$$\tan(\phi + 2\theta) = \frac{\frac{x}{f} + \tan(2\theta)}{1 - \frac{x}{f}\tan(2\theta)}. \quad (8)$$

The angle θ is defined to be the angle between the normal to the mirror and the vertical line at the point of intersection. Since tan(θ)=F'(t), by the double angle formula for the tangent we have that $$\tan(2\theta) = \frac{2F'(t)}{1 - F'(t)^2}.$$

Therefore, $$\frac{\frac{x}{f} + \frac{2F'(t)}{1 - F'(t)^2}}{1 - \frac{x}{f}\frac{2F'(t)}{1 - F'(t)^2}} = \frac{d(x) - t}{F(t)} \quad (9)$$

Notice that t and x are related by the geometry of the figure: F(t)=f+h+f/xt. Therefore, in principle, if one can then solve for t as a function of x, then the above equation provides a formula for d(x).

There are two ways to view equation (9). The first is described above, i.e., if one knows F, then F and t may be computed and these quantities can be substituted into the above equation to determine d(x), which is how the curves in FIG. 10 were computed. On the other hand, one could choose d(x) and then consider equation (9) to be a differential equation satisfied by F. Again, using the equation F(t)=f+h+ft/x, x may be expressed in terms of t and F(t) and may be eliminated from equation (9). If this differential is solved, the resulting mirror will have d as its distance function. It is important to note though, that this property holds only in one chosen plane, and does not scale to other parallel planes. The reasons for this is that the collection of rays that pass through the two planes and reflect off the mirror onto the image plane cannot be extended through the mirror to meet at a single point, i.e., the correspondence between the planes is not a perspective mapping.

Figure 16:
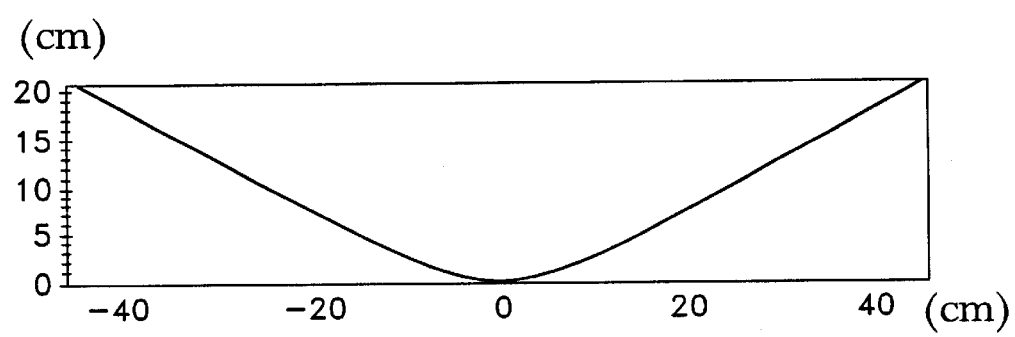
FIG. 16 is a graphical diagram of the cross section of the perspective mirror constructed in accordance with the present invention.

A natural choice for the distance function is d(x)=ax+b in equation (9). If b=0, the real world distance from the camera to the object is proportional to the distance in the image in pixels. The resulting differential equation is too difficult to solve in closed form, but may be solved numerically. An example is depicted in FIG. 16. This is the data that was used to create the mirror in FIGS. 6 and 7. The scaling factor α was taken to be 400 in this case, and the shift b was extremely close. to, but not equal to, 0 (if b=0, then a singularity prevents numerical methods from converging).

We have exhibited a sensor design which has the ability to give a normal camera an ultra-wide field. These sensors are based on a family of mirrors derived as numerical solutions of non-linear differential equations which describe how a plane perpendicular to the optical axis of the system is distorted. By using the geometry of the mirror, the image is unwarped in an analog manner, and so requires no processing time, and thus these devices may be considered as "computational analog sensors". These sensors could be useful for applications such as human monitored surveillance systems and would not require a digital computer. In addition, if one did have a computer available, applications such as motion detection are simplified since the sensor will provide a uniform resolution image of the floor of a room, as opposed to a spherical or parabolic mirror in which the outer regions would suffer from low resolution.

Without further elaboration, the foregoing will so fully illustrate our invention that others may, by applying current or future knowledge, readily adopt the same for use under various conditions of service.

I claim:

1. A mirror for use in a catadioptric system, comprising a substantially circular mirror having a rotationally symmetric cross section by a set of points substantially close to a curve satisfied by a differential equation as follows:

$$\frac{2F'(x)}{1 - F'(x)^2} = \frac{d(x) - x}{F(x)}$$

where x is the horizontal coordinate of the mirror and where the largest value of x is the radius of the mirror and F(x) is the cross-sectional shape.

* * * * *